(12) United States Patent
Toyoshima

(10) Patent No.: US 10,988,010 B2
(45) Date of Patent: Apr. 27, 2021

(54) WEATHER STRIP FOR AUTOMOBILE

(71) Applicant: NISHIKAWA RUBBER CO., LTD., Hiroshima (JP)

(72) Inventor: Takao Toyoshima, Hiroshima (JP)

(73) Assignee: NISHIKAWA RUBBER CO., LTD., Hiroshima-Ken (JP)

( * ) Notice: Subject to any disclaimer, the term of this patent is extended or adjusted under 35 U.S.C. 154(b) by 171 days.

(21) Appl. No.: 16/278,132

(22) Filed: Feb. 17, 2019

(65) Prior Publication Data

US 2019/0255926 A1 Aug. 22, 2019

(30) Foreign Application Priority Data

Feb. 19, 2018 (JP) .............................. JP2018-027429

(51) Int. Cl.
| | |
|---|---|
| *B60J 10/16* | (2016.01) |
| *B60J 10/24* | (2016.01) |
| *B60J 10/84* | (2016.01) |

(52) U.S. Cl.
CPC .............. *B60J 10/16* (2016.02); *B60J 10/24* (2016.02); *B60J 10/84* (2016.02)

(58) Field of Classification Search
None
See application file for complete search history.

(56) References Cited

U.S. PATENT DOCUMENTS

| | | | | | |
|---|---|---|---|---|---|
| 4,411,941 | A | * | 10/1983 | Azzola | B29C 44/22 428/122 |
| 4,513,044 | A | * | 4/1985 | Shigeki | B60J 10/24 428/122 |
| 6,520,563 | B2 | * | 2/2003 | Nozaki | B60J 10/24 296/146.9 |
| 7,097,180 | B2 | * | 8/2006 | Kuzuya | B60J 10/24 277/644 |
| 7,121,046 | B2 | * | 10/2006 | Baratin | B60J 10/24 49/479.1 |
| 7,318,613 | B2 | * | 1/2008 | Hiroe | B29C 48/17 296/1.08 |
| 7,735,263 | B2 | * | 6/2010 | Oba | B60J 10/86 49/490.1 |
| 8,051,607 | B2 | * | 11/2011 | Okajima | B60J 10/32 49/490.1 |

(Continued)

FOREIGN PATENT DOCUMENTS

JP H07137583 A 5/1995

*Primary Examiner* — Catherine A Kelly
(74) *Attorney, Agent, or Firm* — Holtz, Holtz & Volek PC

(57) ABSTRACT

A hollow seal member of a weather strip for an automobile includes a first wall and a second wall. The first wall extends toward a top end of a flange, turns toward a base root of the flange on a first bent point, and protrudes and curves outwardly toward an exterior of the automobile. The second wall extends toward a base root of the flange, turns toward the top end of the flange on a second bent point, and protrudes and curves outwardly toward the exterior of the automobile. Almost a whole inside surface between the first bent point and the second bent point includes a foamed material. Almost a whole outside surface between the first bent point and the second bent point is a film which includes a non-foamed material. An interval on the hollow seal member includes the same non-foamed material as the film.

7 Claims, 5 Drawing Sheets

(56) References Cited

U.S. PATENT DOCUMENTS

| | | | |
|---|---|---|---|
| 8,225,554 B2* | 7/2012 | Nozaki | B60J 10/80 |
| | | | 49/498.1 |
| 9,415,670 B2* | 8/2016 | Masumoto | B60J 10/16 |
| 9,759,003 B2* | 9/2017 | Hirakawa | B60J 10/273 |
| 9,994,095 B2* | 6/2018 | Sato | B60J 10/15 |
| 10,035,410 B2* | 7/2018 | Taketomo | B60J 5/047 |
| 10,513,169 B2* | 12/2019 | Ogawa | B60J 10/84 |
| 2005/0076574 A1* | 4/2005 | Nishihara | B60J 10/277 |
| | | | 49/490.1 |
| 2016/0145927 A1* | 5/2016 | Hirakawa | B60J 10/246 |
| | | | 296/1.04 |

* cited by examiner

WEATHER STRIP FOR AUTOMOBILE

CROSS REFERENCE TO RELATED APPLICATION

This application claims the benefit under 35 USC § 119 of JP Patent Application JP 2018-027429 filed Feb. 19, 2018, the entire disclosure of which is incorporated herein by reference.

BACKGROUND INFORMATION

The present invention relates to a weather strip for an automobile configured to operatively couple to a flange formed along a circumferential edge of a door opening of an automobile body to seal inside and outside of the automobile body by making elastic contact with a door of the automobile.

As shown in FIG. 5 and FIG. 6, a traditional weather strip 10 for an automobile has been configured to operatively couple to a flange formed along a circumferential edge 100 of a door opening of an automobile body (see, for example, Japanese unexamined Patent Application Publication No. 07-137583). The weather strip 10 for the automobile makes elastic contact with a side door 200 when the side door 200 is in a closed position.

As shown in FIG. 7, the weather strip 10 for the automobile includes an installation base member 11 and a hollow seal member 12 integrally formed with the installation base member 11. The installation base member 11 has a substantially U-shaped cross section and is inserted over a flange 101 from an opening of the installation base member 11. The flange 101 is formed along the circumferential edge 100 of the door opening of the automobile body. The hollow seal member 12 is provided on an outer-cabin side of the installation base member 11 and is configured to make elastic contact with the door 200 to seal inside and outside of the automobile body. The installation base member 11 has a core 13 buried therein.

The hollow seal member 12, which projects outwardly toward an exterior of the automobile, of the weather strip 10 for the automobile is formed by sponge material. On a region 400 (a region on the automobile body facing a lower rear side of a front door 200) in FIG. 6, human bodies or luggage may rub against the hollow seal member 12 while passengers are getting in or getting off the automobiles. More specifically, clothes (such as trousers) may rub against the hollow seal member 12 for friction between the human bodies such as waits or hips and the hollow seal member 12. When the friction is larger between the human bodies and the hollow seal member 12, the hollow seal member 12 is worn away and finally damaged, with flaws or holes for example. Especially, a part of the hollow seal member 12, which abuts with the human bodies or the luggage while passengers are getting in or getting off the automobiles, is subjected to hard rub or abrasion, and therefore has to be fortified.

In this connection, it has been proposed to cover a whole surface of the hollow seal member 12 with a film which is formed by solid rubber material.

Unfortunately, however, in case the solid rubber material is worn away, foams under the solid rubber material expose and complaints from customers may be occurred. In addition, this configuration often causes folding wrinkles on the surface of the hollow seal member 12 especially on corner parts of the automobile body, and increases compression load value of the hollow seal member 12 such that the hollow seal member 12 does not keep up to standards, and degrades door closability.

Japanese unexamined Patent Application Publication No. 07-137583 discloses the hollow seal member 12 which is formed by the sponge rubber having specific gravity that falls within a range of 0.9±0.1 for improving abrasion-resistant property and preventing the folding wrinkles.

Unfortunately, however, the hollow seal member 12 of Japanese unexamined Patent Application Publication No. 07-137583 may still be damaged for insufficient strength against strong impact from the human bodies 500 or the luggage. Specifically, while the specific gravity of the hollow seal member 12 of Japanese unexamined Patent Application Publication No. 07-137583 is higher than prior arts, the resultant hollow seal member 12 is still formed by the sponge rubber.

Measures against the abrasion also include covering the hollow seal member 12 with protective tape. But the protective tape is very expensive. Also, it takes a lot of time to arrange the protective tape, which lowers mass productivity.

The weather strip also has a configuration that an end of an interior material is inserted between the installation base member 11 and the hollow seal member 12. The interior material extends outwardly from an interior of the automobile toward an exterior of the automobile. With this configuration, as the human bodies 500 or the luggage come into contact with the hollow seal member 12, the hollow seal member 12, which is deformed, is strongly pressed against the end of the interior material. Since pressure concentrates on a point of contact on the hollow seal member 12 with the end of the interior material, the hollow seal member 12 is easily damaged.

Accordingly, an object of the present invention is to provide the weather strip for the automobile improved in the abrasion-resistant property of the hollow seal member.

It is another object of the present invention to provide the weather strip for the automobile, which prevents the folding wrinkles when couples to the corner parts of the automobile body, prevents the compression load value from becoming too high and meets the standards on the load, and is improved in the door closability.

SUMMARY

In order to achieve the above-mentioned object, according to one aspect of the invention, a weather strip (16, 17, 18) for an automobile is provided, the weather strip (16, 17, 18) including an installation base member (21) and a hollow seal member (22). The installation base member (21) is configured to operably couple to a flange (101) formed along a circumferential edge (100) of a door opening of an automobile body. The installation base member (21) has a substantially U-shaped cross section including an outer-cabin side wall (21a), an inner-cabin side wall (21b) and a connecting wall (21c) which connects the side walls (21a, 21b). The hollow seal member (22) projects outwardly toward an exterior of the automobile and is configured to make elastic contact with a door (200) of the automobile. A first base root (22a) is on the outer-cabin side wall (21a) of the installation base member (21) close to a top end (101a) of the flange (101). A second base root (22b) is on the outer-cabin side wall (21a) of the installation base member (21) close to a base root (101b) of the flange (101). The hollow seal member (22) in cross section includes a first wall (221) having the first base root (22a) forming a part of the first wall (221) and a second wall (222) having the second base root (22b) forming a part of the second wall (222).

The first wall (221) of the hollow seal member (22) in cross section extends from the first base root (22a) toward the top end (101a) of the flange (101) and outwardly toward the exterior of the automobile to a first bent point (60), which is an end of a part extending from the first base root (22a), turns toward the base root (101b) of the flange (101) on the first bent point (60), and protrudes and curves outwardly toward the exterior of the automobile to a part (90) of the hollow seal member (22) closest to the exterior of the automobile. The second wall (222) of the hollow seal member (22) in cross section extends from the second base root (22b) toward the base root (101b) of the flange (101) and outwardly toward the exterior of the automobile to the second bent point (70), which is an end of a part extending from the second base root (22b), turns toward the top end (101a) of the flange (101) on the second bent point (70), and protrudes and curves outwardly toward the exterior of the automobile to the part (90) of the hollow seal member (22) closest to the exterior of the automobile.

Almost a whole inside surface between the first bent point (60) of the hollow seal member (22) and the second bent point (70) is formed by a foamed material. Almost a whole outside surface between the first bent point (60) of the hollow seal member (22) and the second bent point (70) is a film (30) which is formed by a non-foamed material.

An interval (110), at least, between the first bent point (60) of the hollow seal member (22) and a reference point (80) is formed by only the non-foamed material which is same as the non-foamed material of the film (30). The reference point (80) is closer to the exterior of the automobile than the first bent point (60). A part of the hollow seal member (22) adjacent to the reference point (80) is continuous with the film (30).

In addition, according to an aspect of the present invention, an interval between the first bent point (60) of the hollow seal member (22) and a part of the hollow seal member (22) adjacent to the first base root (22a) is formed by only the non-foamed material which is the same as the non-foamed material of the film (30).

In addition, according to an aspect of the present invention, an interval between the first bent point (60) of the hollow seal member (22) and the first base root (22a) is formed by only the non-foamed material which is the same as the non-foamed material of the film (30).

In addition, according to an aspect of the present invention, a thickness of the non-foamed material is gradually increased from the film (30) toward the reference point (80) of the hollow seal member (22). The non-foamed material is the same as the non-foamed material of the film (30).

In addition, according to an aspect of the present invention, a thickness (30T) of the film (30) is thinner than a thickness (22T) of the hollow seal member (22). Hardness of the non-foamed material which forms the film (30) is lower than hardness of a material which forms the installation base member (21).

In addition, according to an aspect of the present invention, a space is formed between the outer-cabin side wall (21a) and a part of the hollow seal member (22) between the first base root (22a) and the first bent point (60), and an end (40a) of an interior material (40) is inserted in the space.

In addition, according to an aspect of the present invention, the non-foamed material which forms the film (30) is formed by a rubber like elastic body which has hardness of not less than 40 measured with JIS K 6253 of Japanese Industrial Standards (JIS), durometer type A. The installation base member (21) is formed by a microporous rubber like elastic body which has hardness of not less than 40 measured with JIS K 6253, durometer type A.

Symbols in parentheses show constituents or items corresponding to the drawings.

According to the present invention, the first base root of the hollow seal member and the second base root are on the outer-cabin side wall of the installation base member which has the substantially U-shaped cross section. The hollow seal member in cross section includes the first wall having the first base root forming the part of the first wall and the second wall having the second base root forming the part of the second wall.

The first wall of the hollow seal member in cross section extends from the first base root toward the top end of the flange and outwardly toward the exterior of the automobile to the first bent point which is the end of the part extending from the first base root, turns toward the base root of the flange on the first bent point, and protrudes and curves outwardly toward the exterior of the automobile to the part of the hollow seal member closest to the exterior of the automobile. The second wall of the hollow seal member in cross section extends from the second base root toward the base root of the flange and outwardly toward the exterior of the automobile to the second bent point which is the end of the part extending from the second base root, turns toward the top end of the flange on the second bent point, and protrudes and curves outwardly toward the exterior of the automobile to the part of the hollow seal member closest to the exterior of the automobile.

Almost the whole inside surface between the first bent point of the hollow seal member and the second bent point is formed by the foamed material, almost the whole outside surface between the first bent point of the hollow seal member and the second bent point is the film which is formed by the non-foamed material, and the interval, at least, between the first bent point and the reference point, which is closer to the exterior of the automobile than the first bent point, is formed by only the non-foamed material which is the same as the non-foamed material of the film. This configuration enables formation of only a part of the hollow seal member, against which human bodies or luggage often rub especially while passengers are getting in the automobiles, with the non-foamed material.

More specifically, the non-foamed material fortifies (increases hardness) the part of the hollow seal member, against which human bodies or luggage often rub. The part as a whole, fortified by the non-foamed material, of the hollow seal member is excellent in an abrasion-resistant property. In other words, even in case the human bodies or luggage strongly rub against the hollow seal member, the hollow seal member abrades on a small scale, slightly peeling for example, not on a large scale with tears or holes. This configuration improves durability of the hollow seal member and prevents exposure of foams under the abraded part of the hollow seal member.

In addition, since the hollow seal member as a whole is not formed by the non-foamed material, a solid (dense) material (hard material) for example, folding wrinkles do not appear on the surface of the hollow seal member, on corner parts of the automobile body especially, and door closability is not degraded.

According to the present invention, the interval, at least, between the first bent point of the hollow seal member and the reference point which is closer to the exterior of the automobile than the first bent point is formed by only the non-foamed material which is the same as the non-foamed material of the film. Additionally, the interval may be between the first bent point of the hollow seal member and the part of the hollow seal member adjacent to the first base root, or between the first bent point of the hollow seal member and the first base root.

The configuration "the interval between the first bent point of the hollow seal member and the first base root is formed by only the non-foamed material which is the same as the non-foamed material of the film" is preferable in case the end of the interior material is inserted in the space between the outer-cabin side wall and the part of the hollow seal member between the first base root and the first bent point.

More specifically, in case the human bodies or the luggage rub against the hollow seal member, the hollow seal member is partially pressed against the end of the interior material strongly and is easily damaged. In this connection, this configuration is very effective in improving the durability of the part which is pressed against the end of the interior material. Also, this configuration stably covers up the end of the interior material without exposing the end of the interior material, and is excellent in appearance.

In addition, the thickness of the film is thinner than the thickness of the hollow seal member, and the hardness of the non-foamed material which forms the film is lower than hardness of the material which forms the installation base member. This configuration controls unnecessary increase in reaction force when the hollow seal member is compressed, and does not degrade door closability.

This configuration is more effective under the conditions that: the non-foamed material which forms the film is formed by the rubber like elastic body which has hardness of not less than 40 measured with JIS K 6253 of Japanese Industrial Standards (JIS), durometer type A; and the installation base member is formed by the microporous rubber like elastic body which has the hardness of not less than 40 measured with JIS K 6253, durometer type A.

DETAILED DESCRIPTION

Figure 1:
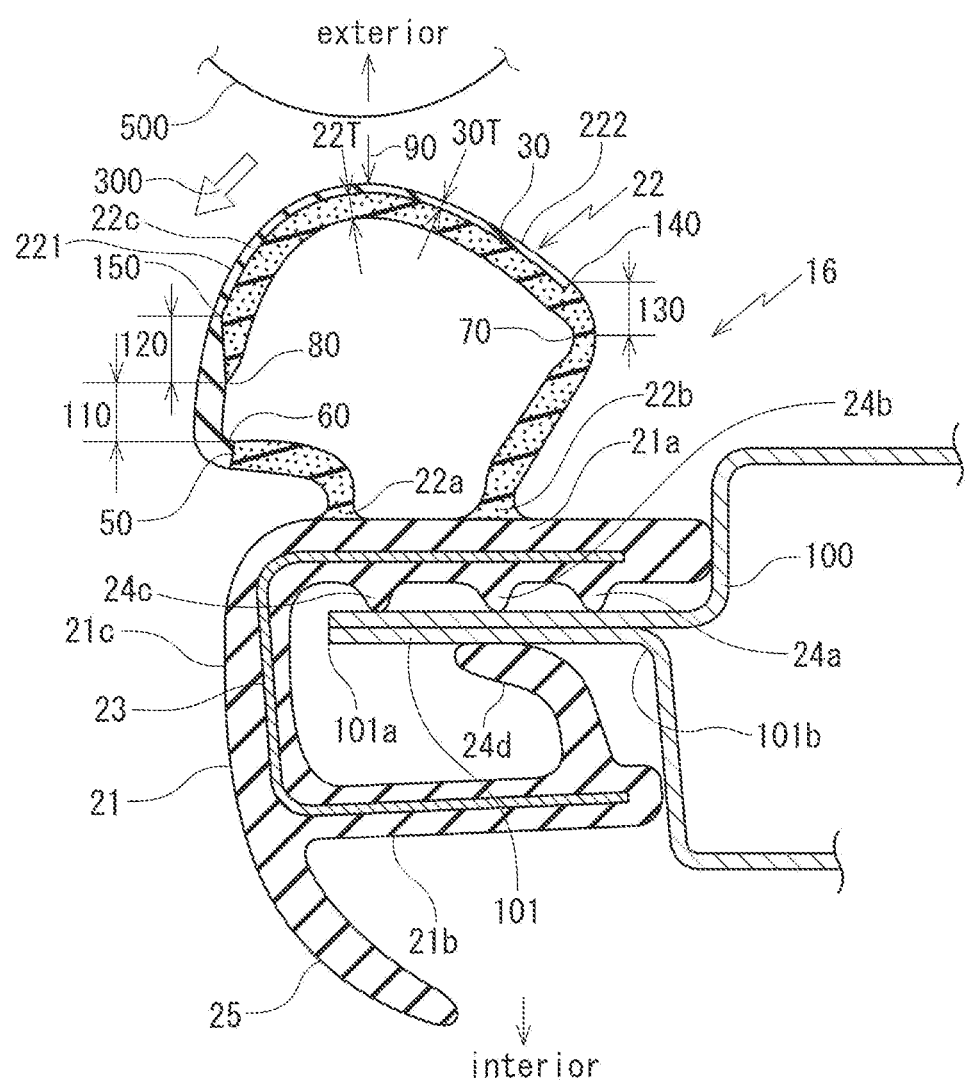
FIG. 1 is an enlarged cross-sectional view of a weather strip according to a first embodiment of the present invention for an automobile taken along line I-I of FIG. 6.
Figure 5:
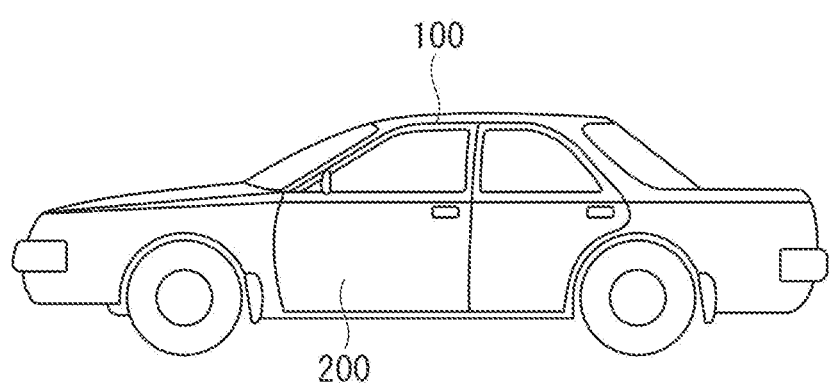
FIG. 5 is a side view of an outward appearance of an automobile.
Figure 6:
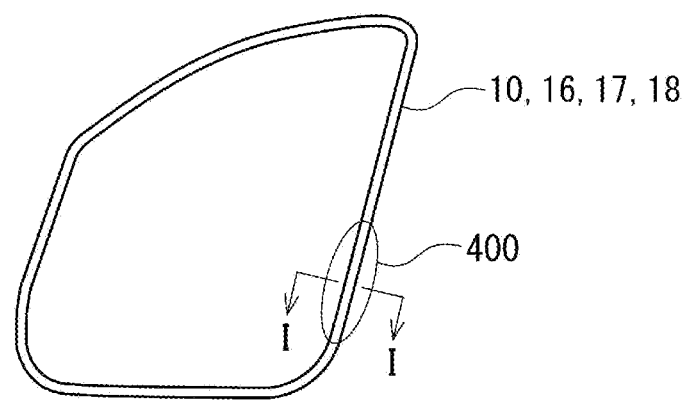
FIG. 6 is an enlarged side view of a weather strip for an automobile configured to operably couple to a front door of the automobile illustrated in FIG. 5.
Figure 7:
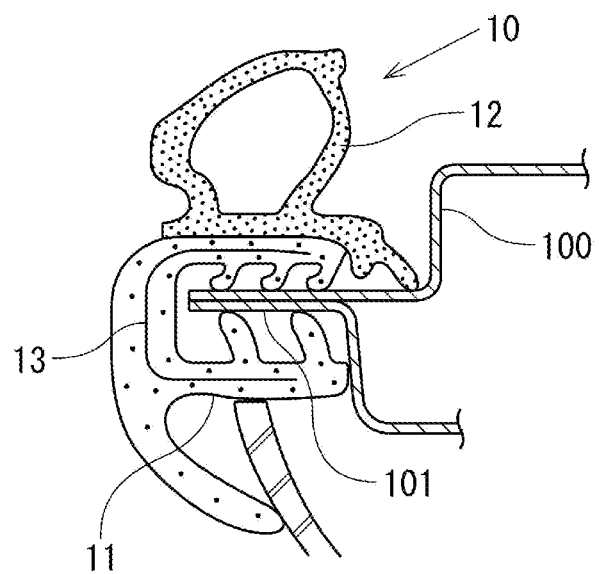
FIG. 7 is an enlarged cross-sectional view of a weather strip according to a prior art for an automobile taken along line I-I of FIG. 6.

Referring to FIGS. 1, 5, and 6, a weather strip according to a first embodiment of the present invention for an automobile will be described. When constituents or items correspond to those in prior arts (FIG. 7), the same symbols are used.

A weather strip 16 according to the first embodiment of the present invention for an automobile is configured to operatively couple to a flange 101 formed along a circumferential edge of a door opening of an automobile body. The weather strip 16 for the automobile includes an installation base member 21 and a hollow seal member 22. The hollow seal member 22 is integrally formed with the installation base member 21 and configured to make elastic contact with a front door 200 when the front door 200 is in a closed position.

The weather strip 16 for the automobile includes a film 30 to cover an outside surface of the hollow seal member 22.

The installation base member 21 has a substantially U-shaped cross section including an outer-cabin side wall 21a, an inner-cabin side wall 21b, and a connecting wall 21c which connects the side walls 21a, 21b. The installation base member 21 has a core 23 (which includes metal or resin) buried therein.

A plurality of protrusions 24a, 24b, 24c, 24d (24a, 24b, 24c are convex shaped projections, 24d is a lip) are formed on an inner-cabin side of the outer-cabin side wall 21a and an outer-cabin side of the inner-cabin side wall 21b, and make elastic contact with both surfaces of the flange 101 over which the installation base member 21 is inserted. In the present embodiment, three protrusions 24a, 24b, 24c are formed on the outer-cabin side wall 21a and a large protrusion 24d, which is larger than the protrusions 24a, 24b, 24c, is formed on the inner-cabin side wall 21b. But the protrusions are not strictly limited in number, size or shape as long as the protrusions stably hold the flange 101.

A decorative lip 25 is formed on a connecting part between the inner-cabin side wall 21b and the connecting wall 21c. The decorative lip 25 has a substantially tongue-shaped cross section.

A first base root 22a and a second base root 22b are on an outer-cabin side of the outer-cabin side wall 21a of the installation base member 21 and are spaced apart from each other. The hollow seal member 22 projects outwardly toward an exterior of the automobile. The first base root 22a is on the outer-cabin side wall 21a close to a top end 101a of the flange 101 and the second base root 22b is on the outer-cabin side wall 21a close to a base root 101b of the flange 101 opposite the top end 101a of the flange 101.

The hollow seal member 22 in cross section includes a first wall 221 having the first base root 22a forming a part of the first wall 221 and a second wall having the second base root 22b forming a part of the second wall 222. The first wall 221 extends substantially perpendicularly to the flange 101 from the first base root 22a, widely curves (substantially at a right angle) toward the top end 101a of the flange 101, and diagonally extends, at an angle of gentle inclination, toward the top end 101a of the flange 101 and outwardly toward the exterior of the automobile to the first bent point 60, which is an end of a part extending from the first base root 22a. The first wall 221 turns toward the base root 101b of the flange 101 on the first bent point 60, and protrudes and curves outwardly toward the exterior of the automobile to the part 90 of the hollow seal member 22 closest to the exterior of the automobile.

The second wall 222 diagonally extends, at an angle of steep inclination, from the second base root 22b toward the base root 101b of the flange 101 and outwardly toward the exterior of the automobile to the second bent point 70, which is an end of a part extending from the second base root 22b.

The second wall 222 turns toward the top end 101a of the flange 101 on the second bent point 70, and protrudes and curves outwardly toward the exterior of the automobile to the part 90 of the hollow seal member 22 closest to the exterior of the automobile.

More specifically, the hollow seal member 22 in cross section diagonally extends from the first base root 22a of the first wall 221 and the second base root 22b of the second wall 222 such that the first wall 221 and the second wall 222 are diagonally spaced apart from each other, gradually widened in other words, relative to the outer-cabin side wall 21a. A first end of a curved part 22c close to the top end 101a of the flange 101 connects with the first base root 22a. A second end of the curved part 22c close to the base root 101b of the flange 101 connects with the second base root 22b. The curved part 22c curves outwardly toward the exterior of the automobile. The hollow seal member 22 has a shape of a pantograph in cross section, in which the first bent point 60 (close to the top end 101a of the flange 101) and the second bent point 70 (close to the base root 101b of the flange 101) are spaced apart from each other.

Almost a whole inside surface between the first bent point 60 of the hollow seal member 22 and the second bent point 70 is formed by a foamed material. Almost a whole outside surface between the first bent point 60 of the hollow seal member 22 and the second bent point 70 is the film 30 which is formed by a non-foamed material.

It is to be noted that "almost a whole inside surface between the first bent point 60 of the hollow seal member 22 and the second bent point 70" is (distance between the first bent point 60 and the second bent point 70) minus (distance between the first bent point 60 and a reference point 80).

In addition, "almost a whole outside surface between the first bent point 60 of the hollow seal member 22 and the second bent point 70" is (distance between the first bent point 60 and the second bent point 70) minus (distance between the second bent point 70 and a part 140).

In the present embodiment, "the foamed material" includes a microporous solid material, which comes close to the solid (dense) material (hard material), with a slight number of foams as well as a sponge material (soft material) with a large number of foams.

In addition, "the non-foamed material" includes only the solid (dense) material (hard material) without any foams.

In the present embodiment, a rubber like elastic body which includes materials with elasticity is applicable to the foamed material and the non-foamed material. Examples of the rubber like elastic body include rubber and thermoplastic elastomer.

In the present embodiment, the foamed material for use as the inside surface of the hollow seal member is formed by sponge rubber (specific gravity about 0.6), the non-foamed material for use as the film which is the outside surface of the hollow seal member is formed by solid rubber (specific gravity about 1.2, hardness about 50 degrees), and the non-foamed material for use as the installation base member is formed by the solid rubber (specific gravity about 1.2, hardness about 70 degrees).

The non-foamed materials for use as the film and for use as the installation base member have substantially the same specific gravity. But, since a flexible base polymer is used for the rubber as a raw material, the non-foamed material as a resultant product subjected to vulcanization and extrusion molding has the hardness about 50 degrees.

The non-foamed material, which is relatively low in the hardness and without any foams, for use as the outside surface of the hollow seal member prevents unnecessary increase in the compression load value (reaction force), and in case human bodies or luggage rub against the surface of the hollow seal member, foams are not visible.

Alternatively, the installation base member may be formed by microporous solid rubber (specific gravity about 0.7, hardness about 50 degrees), which is a slightly-foamed solid rubber, instead of the non-foamed solid rubber (specific gravity about 1.2, hardness about 70 degrees), to reduce weight of the weather strip for the automobile.

Figure 3:
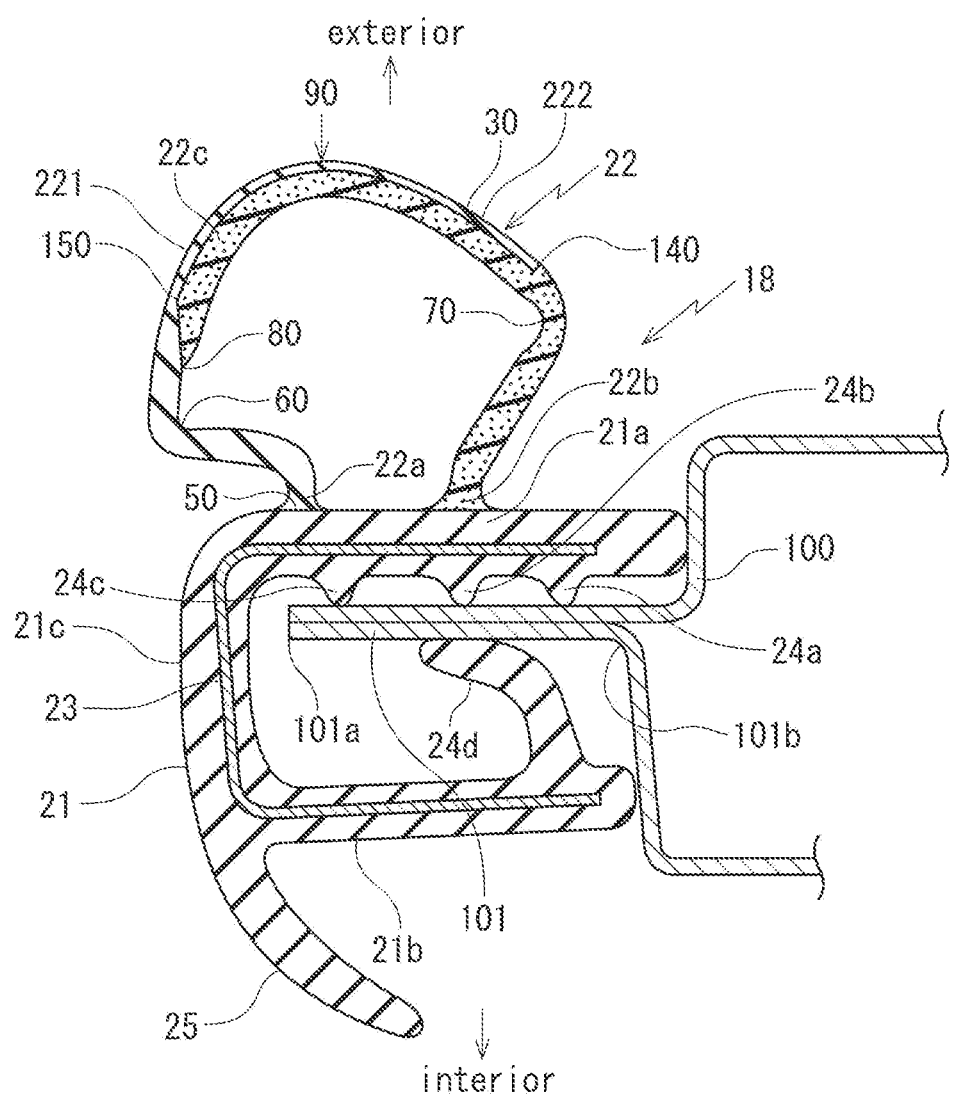
FIG. 3 is an enlarged cross-sectional view of a weather strip according to a third embodiment of the present invention for an automobile taken along line I-I of FIG. 6.
Figure 4:
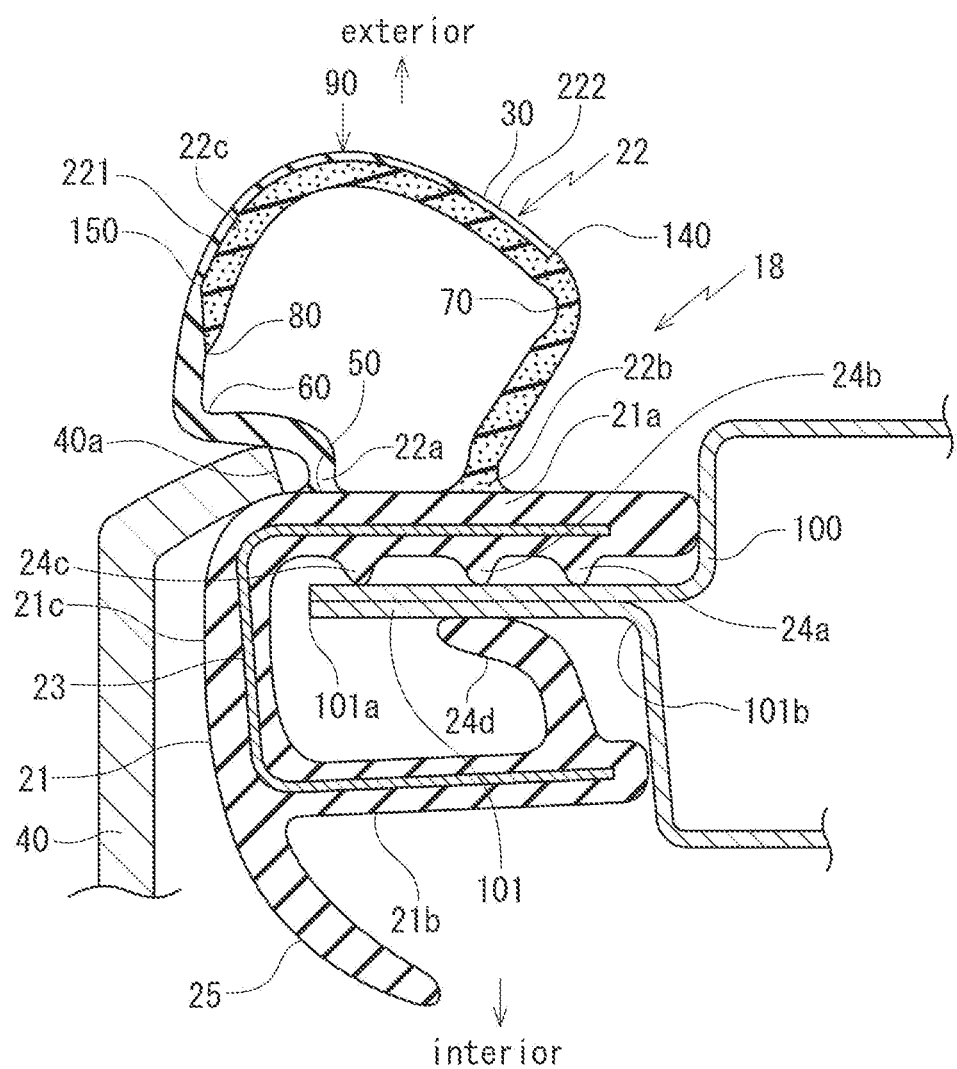
FIG. 4 is the enlarged cross-sectional view of the weather strip according to the third embodiment of the present invention for the automobile taken along line I-I of FIG. 6, with an end of an interior material inserted in the weather strip.

The microporous solid rubber is preferable under a configuration according to a third embodiment of the present invention with a border 50 on a position illustrated in FIG. 3 and FIG. 4. This configuration reduces the weight as well as prevents exposure of the foams.

More specifically, an interval 110 (about 2.3 mm in the present embodiment) between the first bent point 60 and the reference point 80 is formed by the non-foamed material which is the same as the non-foamed material of the film 30. The reference point 80 is closer to the exterior of the automobile than the first bent point 60. The interval 110 adjacent to the reference point 80 is continuous with the film 30.

The film 30 has a uniform thickness 30T and covers an outside surface of the hollow seal member 22 between a part 140 and a part 150. The part 140 is closer to the exterior of the automobile than the second bent point 70. The part 150 is closer to the exterior of the automobile than the reference point 80.

A thickness of the non-foamed material is gradually increased from the part 150, which is closer to the exterior of the automobile than the reference point 80, toward the reference point 80. The non-foamed material is the same as the non-foamed material of the film 30. On the reference point 80, the hollow seal member 22 is formed by only the non-foamed material which is the same as the non-foamed material of the film 30.

The film 30 is formed between the part 140 and the part 150. The thickness 30T of the film 30 between the part 140 and the part 150 is thinner than a thickness 22T of the foamed material for use as the inside surface of the hollow seal member 22.

The film 30 is formed only between the part 140 and the part 150, without passing the part 140 toward the interior of the automobile.

As illustrated in FIGS. 1 to 4, in the present embodiment, the part 150 is closer to the exterior of the automobile than the reference point 80 by an interval 120 (about 1.8 mm in the present embodiment).

The part 140 is closer to the exterior of the automobile than the second bent point 70 by an interval 130 (about 2.0 mm in the present embodiment).

This configuration enables formation of a limited part of the hollow seal member 22, against which human bodies 500 (waists or hips) or luggage often rub as shown by an arrow 300 in FIG. 1 while passengers are getting in the automobiles, only with the non-foamed material. Accordingly, this configuration remarkably improves durability of the hollow seal member 22 and prevents damages on the hollow seal member 22, as compared with the limited part of the hollow seal members which is formed by the foamed material.

In addition, since the hollow seal member 22 as a whole does not include the non-foamed material, folding wrinkles hardly appear on the surface of the hollow seal member 22. Also, the hollow seal member 22 prevents unnecessary increase in the compression load value, and meets the standards on the load, and therefore is improved in the door closability.

The film 30 and the hollow seal member 22 are simultaneously molded by extrusion. A part of the hollow seal member 22 continuous with the film 30 is formed by the non-foamed material which is the same as the non-foamed material of the film 30. Except for the film 30 and the part which is formed by the same non-foamed material as the film 30, the hollow seal member 22 is formed by s the foamed material.

A reference numeral 50 indicates a border on the hollow seal member 22 between the non-foamed material which is the same as the non-foamed material of the film 30 and the foamed material for use as a part adjacent to the first base root 22a.

Hardness of the non-foamed material which forms the film 30 is lower than hardness of a material which forms the installation base member 21.

In the present embodiment, the hardness of the non-foamed material which forms the film 30 is 50 degrees, and the hardness of the non-foamed material which forms the installation base member 21 is 70 degrees.

According to the weather strip 20 according to the first embodiment of the present invention for the automobile, almost the whole inside surface of the hollow seal member 22 is formed by the foamed material, and almost the whole outside surface of the hollow seal member 22 is the film 30 which is formed by the non-foamed material. The interval 110, at least, between the first bent point 60 and the reference point 80, which is closer to the exterior of the automobile than the first bent point 60, is formed by only the non-foamed material which is the same as the non-foamed material of the film 30. This configuration enables formation of the limited part of the hollow seal member 22, against which human bodies 500 or luggage often rub especially while passengers are getting in the automobiles, with the non-foamed material.

More specifically, the non-foamed material fortifies (increases hardness) the part of the hollow seal member 22, against which human bodies or luggage often rub. The part as a whole, fortified by the non-foamed material, of the hollow seal member 22 is excellent in an abrasion-resistant property. In other words, even in case the parts of human bodies or luggage strongly rub against the hollow seal member 22, the hollow seal member 22 abrades on a small scale, slightly peeling for example, not on a large scale with tears or holes. This configuration improves durability of the hollow seal member 22 and prevents exposure of the foams included in the material under the abraded part of the hollow seal member 22.

In addition, since the hollow seal member 22 as a whole is not formed by the non-foamed material, the solid (dense) material (hard material) for example, folding wrinkles do not appear on the surface of the hollow seal member 22, on corner parts of the automobile body especially, and door closability is not degraded.

In addition, the thickness 30T of the film 30 is thinner than the thickness 22T of the hollow seal member 22, and the hardness of the non-foamed material which forms the film 30 is lower than hardness of the material which forms the installation base member 21. This configuration controls unnecessary increase in reaction force when the hollow seal member 22 is compressed, and therefore does not degrade door closability.

Figure 2:
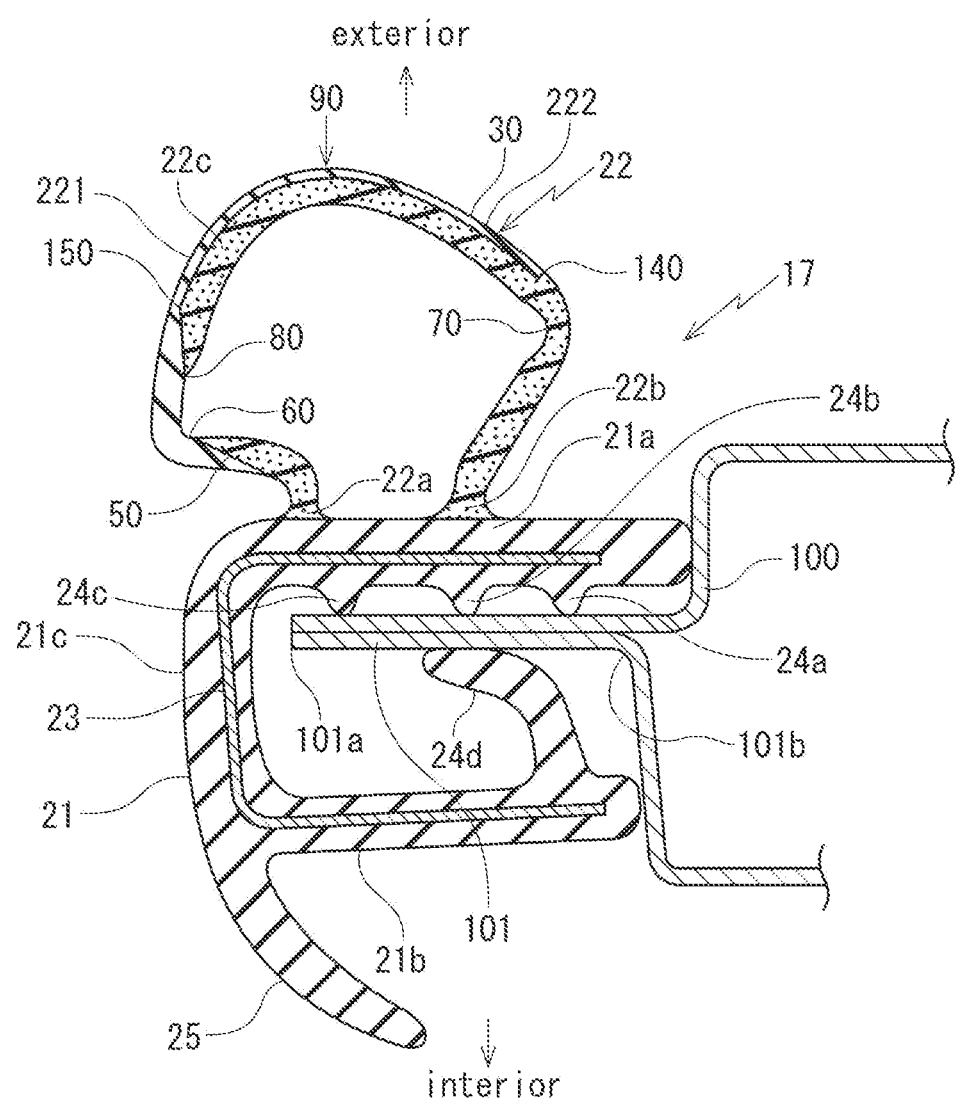
FIG. 2 is an enlarged cross-sectional view of a weather strip according to a second embodiment of the present invention for an automobile taken along line I-I of FIG. 6.

While in the first embodiment illustrated in FIG. 1, the border 50 is substantially perpendicular to the outer-cabin side wall 21a between the non-foamed material which is the same as the non-foamed material of the film 30 and the foamed material for use as the part adjacent to the first base root 22a, this should not be construed in a limiting sense. A second embodiment as another possible embodiment illustrated in FIG. 2 is that the border 50 is diagonal and inclined toward the base root 101b of the flange 101 on a part closer to the interior of the automobile.

A third embodiment as still another possible embodiment illustrated in FIG. 3 is that the border 50 is attached to the outer-cabin side wall 21a such that first base root 22a of the hollow seal member 22 as well as the first bent point 60 is formed by only the non-foamed material which is the same as the non-foamed material of the film 30.

The configuration is preferable in the third embodiment illustrated in FIG. 4 that the end 40a of the interior material 40 is inserted in the space between the outer-cabin side wall 21a and the part of the hollow seal member 22 between the first base root 22a and the first bent point 60.

More specifically, in case the human bodies or the luggage rub against the hollow seal member 22, the hollow seal member 22 is partially pressed against the end 40a of the interior material 40 strongly and is easily damaged. In this connection, this configuration is very effective in improving the durability of the part which is pressed against the end 40a of the interior material 40. Also, this configuration stably covers up the end 40a of the interior material 40 without exposing the end 40a of the interior material 40, and is excellent in appearance.

I claim:

1. A weather strip for an automobile, the weather strip comprising:

an installation base member operably couplable to a flange formed along a circumferential edge of a door opening of an automobile body, the installation base member having a substantially U-shaped cross section including an outer-cabin side wall, an inner-cabin side wall, and a connecting wall which connects the side walls; and a hollow seal member which projects outwardly toward an exterior of the automobile and is configured to make elastic contact with a door of the automobile, the hollow seal member in cross section including:

a first wall having a first base root forming a part of the first wall, the first base root being on the outer-cabin side wall of the installation base member close to a top end of the flange, the first wall extending from the first base root toward the top end of the flange and outwardly toward the exterior of the automobile to a first bent point which is an end of a part extending from the first base root, turning toward a base root of the flange on the first bent point, and protruding and curving outwardly toward the exterior of the automobile to a part of the hollow seal member closest to the exterior of the automobile; and a second wall having a second base root forming a part of the second wall, the second base root being on the outer-cabin side wall of the installation base member close to the base root of the flange, the second wall extending from the second base root toward the base root of the flange and outwardly toward the exterior of the automobile to the second bent point which is an end of a part extending from the second base root, turning toward the top end of the flange on the second bent point, and protruding and curving outwardly toward the exterior of the automobile to the part of the hollow seal member closest to the exterior of the automobile, wherein substantially an entirety of an inside surface of the hollow seal member between the first bent point and the second bent point comprises a foamed material, and substantially an entirety of an outside surface of the hollow seal member between the first bent point and the second bent point is a film which comprises a non-foamed material, and wherein an interval of the hollow seal member between the first bent point and a reference point comprises only the non-foamed material, the reference point being closer to the exterior of the automobile than the first bent point, and a part of the hollow seal member adjacent to the reference point is continuous with the film.

2. The weather strip as claimed in claim 1, wherein an interval between the first bent point and a part of the hollow seal member adjacent to the first base root comprises the non-foamed material.

3. The weather strip as claimed in claim 1, wherein an interval between the first bent point and the first base root comprises the non-foamed material.

4. The weather strip as claimed in claim 1, wherein a thickness of the non-foamed material gradually increases from a part of the film toward the reference point, the part of the film being closer to the exterior of the automobile than the reference point.

5. The weather strip as claimed in claim 1, wherein a thickness of the film is thinner than a thickness of the inside surface of the hollow seal member, and a hardness of the non-foamed material which forms the film is lower than a hardness of a material which forms the installation base member.

6. The weather strip as claimed in claim 1, wherein a space is formed between the outer-cabin side wall and a part of the hollow seal member between the first base root and the first bent point, and an end of an interior material is insertable in the space.

7. The weather strip as claimed in claim 1, wherein the non-foamed material which forms the film comprises a rubber-like elastic body, the rubber-like elastic body having a hardness of not less than 40 measured with JIS K 6253, durometer type A, and the material which forms the installation base member comprises a microporous rubber-like elastic body, the microporous rubber-like elastic body having a hardness of not less than 40 measured with JIS K 6253, durometer type A.

* * * * *